US009460001B2

(12) United States Patent
Pendharkar et al.

(10) Patent No.: US 9,460,001 B2
(45) Date of Patent: Oct. 4, 2016

(54) SYSTEMS AND METHODS FOR IDENTIFYING ACCESS RATE BOUNDARIES OF WORKLOADS

(71) Applicant: Symantec Corporation, Mountain View, CA (US)

(72) Inventors: Niranjan Pendharkar, Pune (IN); Shailesh Marathe, Pune (IN); Sumit Dighe, Pune (IN); Ronald Karr, Palo Alto, CA (US); Bhooshan Thakar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 193 days.

(21) Appl. No.: 14/269,192

(22) Filed: May 4, 2014

(65) Prior Publication Data

US 2015/0269067 A1   Sep. 24, 2015

(30) Foreign Application Priority Data

Mar. 21, 2014  (IN) .............................. 366/KOL/2014

(51) Int. Cl.
*G06F 3/06* (2006.01)
*G06F 12/02* (2006.01)
*G06F 13/16* (2006.01)
*G06F 11/34* (2006.01)

(52) U.S. Cl.
CPC ......... *G06F 12/023* (2013.01); *G06F 11/3466* (2013.01); *G06F 13/1668* (2013.01); *G06F 11/3409* (2013.01); *G06F 11/3471* (2013.01); *G06F 2201/81* (2013.01); *G06F 2201/885* (2013.01); *G06F 2212/1044* (2013.01); *G06F 2212/451* (2013.01); *G06F 2212/621* (2013.01)

(58) Field of Classification Search
CPC ..... G06F 3/061; G06F 3/0647; G06F 3/0683
See application file for complete search history.

(56) References Cited

U.S. PATENT DOCUMENTS 9,058,281 B2 *  6/2015  Goss ................... G06F 12/0871
2004/0068627 A1 *  4/2004  Sechrest ............... G06F 12/122
                                                   711/158

* cited by examiner

*Primary Examiner* — Edward Dudek, Jr.
(74) *Attorney, Agent, or Firm* — ALG Intellectual Property, LLC

(57) ABSTRACT

A computer-implemented method for identifying access rate boundaries of workloads may include (1) tracking the number of times each region of data within a plurality of regions of data is accessed during a period of time, (2) creating an ordered list of each region of data from the plurality of regions of data, (3) calculating one or more drops in access rates between two or more regions of data in the ordered list, (4) determining that a calculated access-rate drop from a first region of data to a second region of data exceeds a predefined threshold, and (5) calculating a boundary access rate for a workload of data. Various other methods, systems, and computer-readable media are also disclosed.

20 Claims, 9 Drawing Sheets

SYSTEMS AND METHODS FOR IDENTIFYING ACCESS RATE BOUNDARIES OF WORKLOADS

BACKGROUND

Traditional data storage systems may increase the accessibility of data by caching frequently accessed regions of data in high performance storage systems (e.g., caches). Because caches are often more expensive than primary storage devices, traditional storage systems may have limited cache space and may only cache the most frequently-accessed regions of data. Furthermore, some caching systems implement caching in flash memory, and flash memory caching may be costlier (in terms of performance) that random-access-memory (RAM) caching. Thus, traditional caching systems may attempt to carefully select regions of data for caching to optimize system performance.

In an attempt to select the best regions of data to cache, traditional data storage systems may implement a policy of caching only regions of data with access rates that are higher than a predefined, static threshold. However, caching systems that use static thresholds may be inflexible and may fail to optimize the use of caches. For example, if access frequency for a set of data blocks is lower than a static threshold but higher than access frequencies of all other uncached data blocks, traditional systems may not cache the set of data blocks even when a cache has space for the blocks. Conversely, if a cache is full, traditional systems may be unable to cache some data blocks with access frequencies higher than a threshold, even if those data blocks have higher access rates than some cached data blocks. Furthermore, dealing with a full cache may result in thrashing, which may be particularly problematic in flash-based caches. What is needed, therefore, are improved systems and methods for utilizing and configuring data caches.

SUMMARY

As will be described in greater detail below, the instant disclosure generally relates to systems and methods for dynamically identifying access rate boundaries of workloads. In one example, a computer-implemented method for performing such a task may include (1) tracking the number of times each region of data within a plurality of regions of data is accessed during a period of time, (2) creating, based on the number of accesses tracked for each region of data, an ordered list of each region of data from the plurality of regions of data, (3) calculating one or more drops in access rates between two or more regions of data in the ordered list, (4) determining that a calculated access-rate drop from a first region of data to a second region of data exceeds a predefined threshold, and, in response to making that determination, (5) calculating, based on an access rate of the first region of data, a boundary access rate for a workload of data. In this example, the workload may be a set of regions of data that includes regions of data with access rates greater than the boundary access rate and excludes regions of data with access rates less than the boundary access rate.

In one embodiment, the above-described method may use the boundary access rate to identify regions of data with access rates greater than the boundary access rate. In this embodiment, the identified regions of data may represent the workload. In some embodiments, the identified regions of data (i.e., the workload) may be cached to a storage location with higher performance than an original storage location of the identified regions of data. Additionally or alternatively, an optimal cache size may be determined based on a size of the workload. This optimal cache size may be reported to a user and/or used to create a cache.

According to various embodiments, the method may further include (1) identifying a first region of data with access rates greater than the boundary access rate and a second region of data with access rates greater than the boundary access rate, (2) inferring a correlation between the first and second regions of data based on the access rates of the first and second regions of data, and, when the second region of data is cached, (3) automatically caching the first region of data based on the inferred correlation between the first and second regions of data.

In one embodiment, the method may further include creating a historical data set and calculate a long-term boundary access rate based on the historical data set. In such embodiments, at least one region of data may be cached based on the long-term boundary access rate. Additionally or alternatively, the method may include (1) identifying, based on the long-term boundary access rate, a workload and (2) determining an optimal cache size based on how much space is needed to cache the workload.

In certain embodiments, the above-described method may create an ordered list by listing each region of data in descending order from most accessed to least accessed based on the number of accesses tracked for each region of data. Additionally or alternatively, the above-described method may create an ordered list by listing each region of data in ascending order from least accessed to most accessed based on the number of accesses tracked for each region of data.

According to various embodiments, the above-described method may calculate an access-rate drop by calculating drops between regions of data that are less than a predetermined number of regions apart in the ordered list. Additionally or alternatively, the above-described method may determine that a calculated access-rate drop from a first region of data to a second region of data exceeds a predefined threshold by determining that a calculated access-rate drop from a first region of data to a second region of data exceeds a predefined percentage drop.

In some examples, a system for dynamically identifying access rate boundaries of workloads may include (1) a tracking module that tracks the number of times each region of data within a plurality of regions of data is accessed during a period of time, (2) a creation module that creates, based on the number of accesses tracked for each region of data, an ordered list of each region of data from the plurality of regions of data, (3) a processing module that calculates drops in access rates between two or more regions of data in the ordered list, (4) a determination module that determines that a calculated access-rate drop from a first region of data to a second region of data exceeds a predefined threshold, and (5) a calculation module that calculates, based on an access rate of the first region of data, a boundary access rate for a workload of data.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) track the number of times each region of data within a plurality of regions of data is accessed during a period of time, (2) create, based on the number of accesses tracked for each region of data, an ordered list of each region of data from the plurality of regions of data, (3) calculate one or more drops in access rates between two or more regions of data in the ordered list, (4) determine that a calculated access-rate drop from a first region of data to a second region of data exceeds a predefined threshold, and, in response to making that determination, (5) calculate, based on an access rate of the first region of data, a boundary access rate for a workload of data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
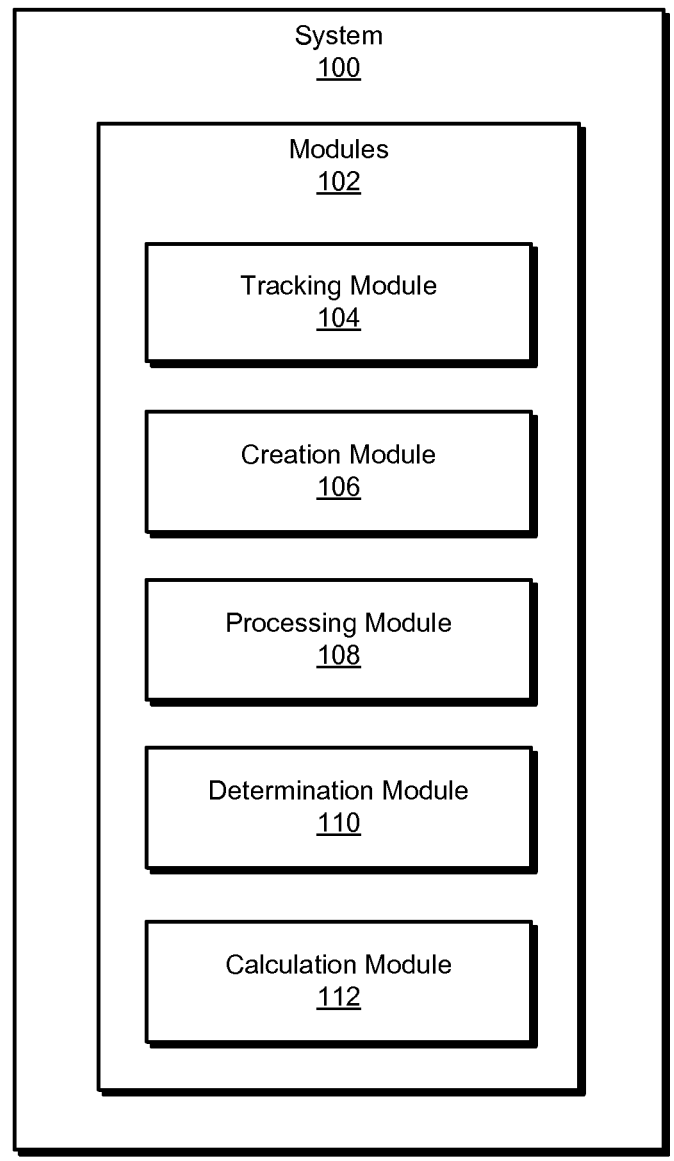
FIG. 1 is a block diagram of an exemplary system for identifying access rate boundaries of workloads.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying access rate boundaries of workloads. As will be explained in greater detail below, the systems and methods described herein may track the number of times each region of data within a plurality of regions of data is accessed within a period of time and may list the regions of data in order based on access frequency. An access-frequency list may be used to identify a workload boundary (e.g., a boundary between data regions with relatively high access frequencies and data regions with relatively low access frequencies), and the workload boundary may be used to calculate an optimal cache size and/or to select regions of data to cache.

Basing caching decisions on workload boundaries may be particularly useful in managing block-level caching. For example, the systems and methods described herein may improve caching with logical volume managers, with dynamic multi-pathing for VMWARE, in WINDOWS VOLUMES, and/or in virtualization environments to cache data for virtual disks (e.g., as an independent filter module). The systems and methods described herein may improve caching by improving application performance and/or by reducing input/output workload on a storage network. The systems and methods described herein may also provide various other features and advantages.

Figure 2:
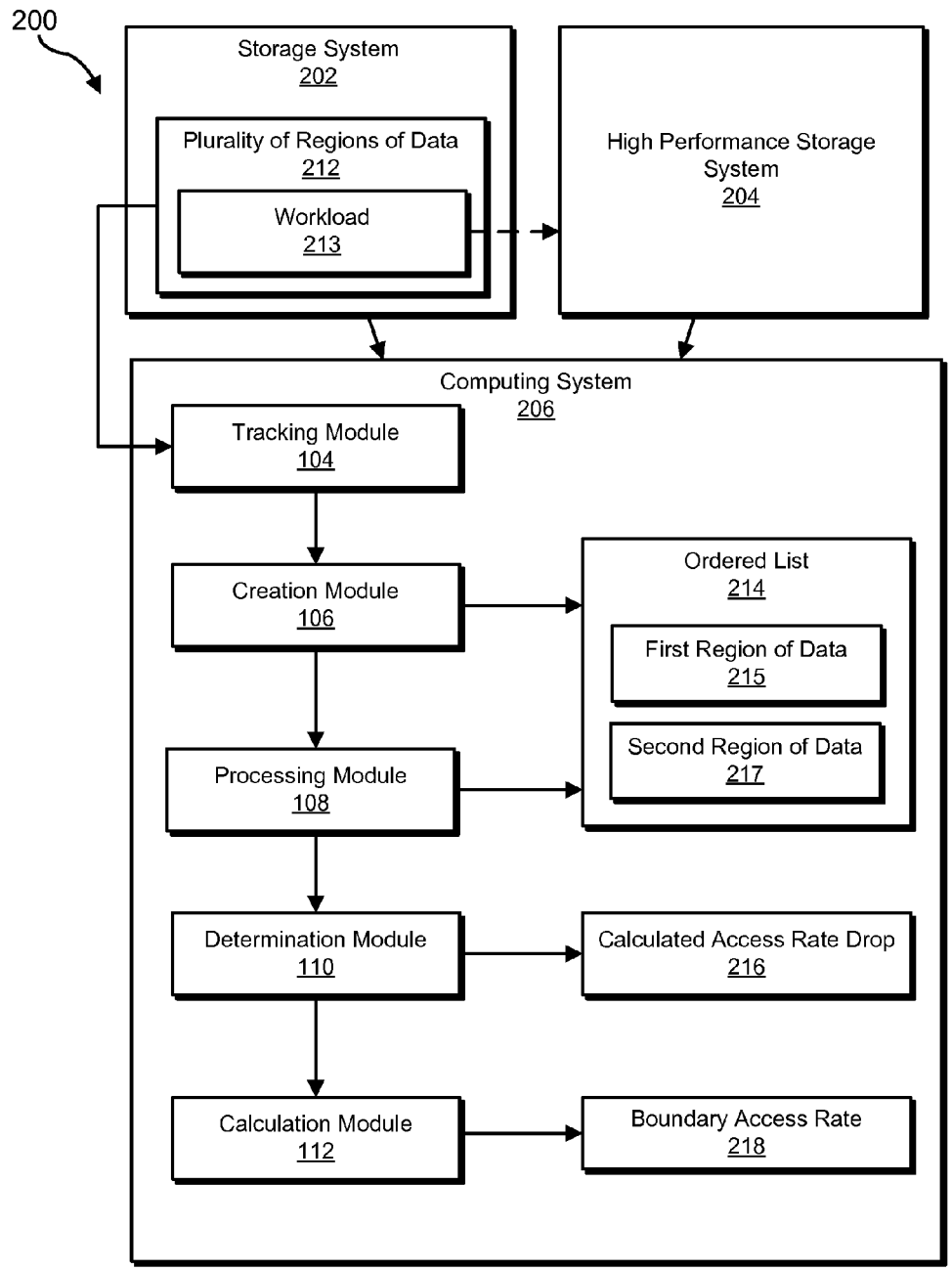
FIG. 2 is a block diagram of an additional exemplary system for identifying access rate boundaries of workloads.

The following will provide, with reference to FIGS. 1 and 2, detailed descriptions of exemplary systems for identifying access rate boundaries of workloads. Detailed descriptions of corresponding computer-implemented methods will also be provided in connection with FIGS. 3-6. Detailed descriptions of workload boundaries will be discussed in connection with FIG. 7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for identifying access rate boundaries of workloads. As illustrated in this figure, exemplary system 100 may include one or more modules 102 for performing one or more tasks. For example, and as will be explained in greater detail below, exemplary system 100 may include a tracking module 104 that tracks the number of times regions of data are accessed during a period of time. Exemplary system 100 may also include a creation module 106 that creates an ordered list of regions of data and a processing module 108 that calculates drops in access rates between two or more regions of data in the ordered list.

In addition, and as will be described in greater detail below, exemplary system 100 may include a determination module 110 that determines that a calculated access-rate drop between first and second regions of data exceeds a predefined threshold. Exemplary system 100 may also include a calculation module 112 that calculates a boundary access rate for a workload of data based on an access rate of the first region of data. Although illustrated as separate elements, one or more of modules 102 in FIG. 1 may represent portions of a single module or application.

The functionality of modules 102 may be implemented at both the user level and the kernel level, with a user-level process orchestrating the entire caching procedure. For example, all or a portion of tracking module 104 may operate at the kernel level, while creation module 106, processing module 108, determination module 110, and calculation module 112 may execute as part of a user-level process. Alternatively, if a user-level process is unable to function for some reason (e.g., if the user-level process is dead), some or all functionality of the user-level process may be performed at the kernel level. For example, a kernel may make simple determinations regarding which regions of data to cache based on a static caching threshold.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 206, storage system 202, and/or high performance storage system 204), computing system 810 in FIG. 8, and/or portions of exemplary network architecture 900 in FIG. 9. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing system 206 in communication with a storage system 202 (e.g., a primary storage system) and a high performance storage system 204 (e.g., a fast storage system, such as an SSD or flash-based memory, that may be used as a cache). In one example, computing system 206 may be programmed with one or more of modules 102.

In one embodiment, one or more of modules 102 from FIG. 1 may, when executed by at least one processor of computing system 206, enable computing system 206 to identify access rate boundaries of workloads. For example, and as will be described in greater detail below, one or more of modules 102 may cause computing system 206 to (1) track the number of times each region of data within a plurality of regions of data 212 is accessed during a period of time, (2) create an ordered list 214 of each region of data from the plurality of regions of data 212, (3) calculate one or more drops in access rates between two or more regions of data in ordered list 214, (4) determine that a calculated access-rate drop 216 from a first region of data 215 to a second region of data 217 exceeds a predefined threshold, and (5) calculate a boundary access rate 218 for a workload of data 213. A workload 213 may be identified based on boundary access rate 218. Workload 213 may be cached from storage system 202 to high performance storage system 204 or used to determine an optimal cache size for high performance storage system 204.

Storage system 202 and high performance storage system 204 generally represent any type or form of device that is capable of storing data and/or computer-readable information. Examples of storage system 202 and high performance storage system 204 include, without limitation, magnetic disk drives (e.g., so-called hard drives), solid state drives, flash memory, magnetic tape drives, optical disk drives, storage arrays, cloud-based storage devices, etc. In some examples, storage system 202 and high performance storage system 204 may operate as part of computing system 206 as a single device or one or both may operate as an external device, e.g., a SAN device, a NAS device, etc. In some examples, storage system 202 and high performance storage system 204 may represent a portion of a larger computing system (e.g., computing system 206), examples of which include, without limitation, laptops, tablets, desktops, servers, cellular phones, Personal Digital Assistants (PDAs), multimedia players, embedded systems, combinations of one or more of the same, exemplary computing system 810 in FIG. 8, or any other suitable computing device.

Computing system 206 generally represents any type or form of computing device capable of reading computer-executable instructions. Examples of computing system 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 810 in FIG. 8, or any other suitable computing device.

Figure 3:
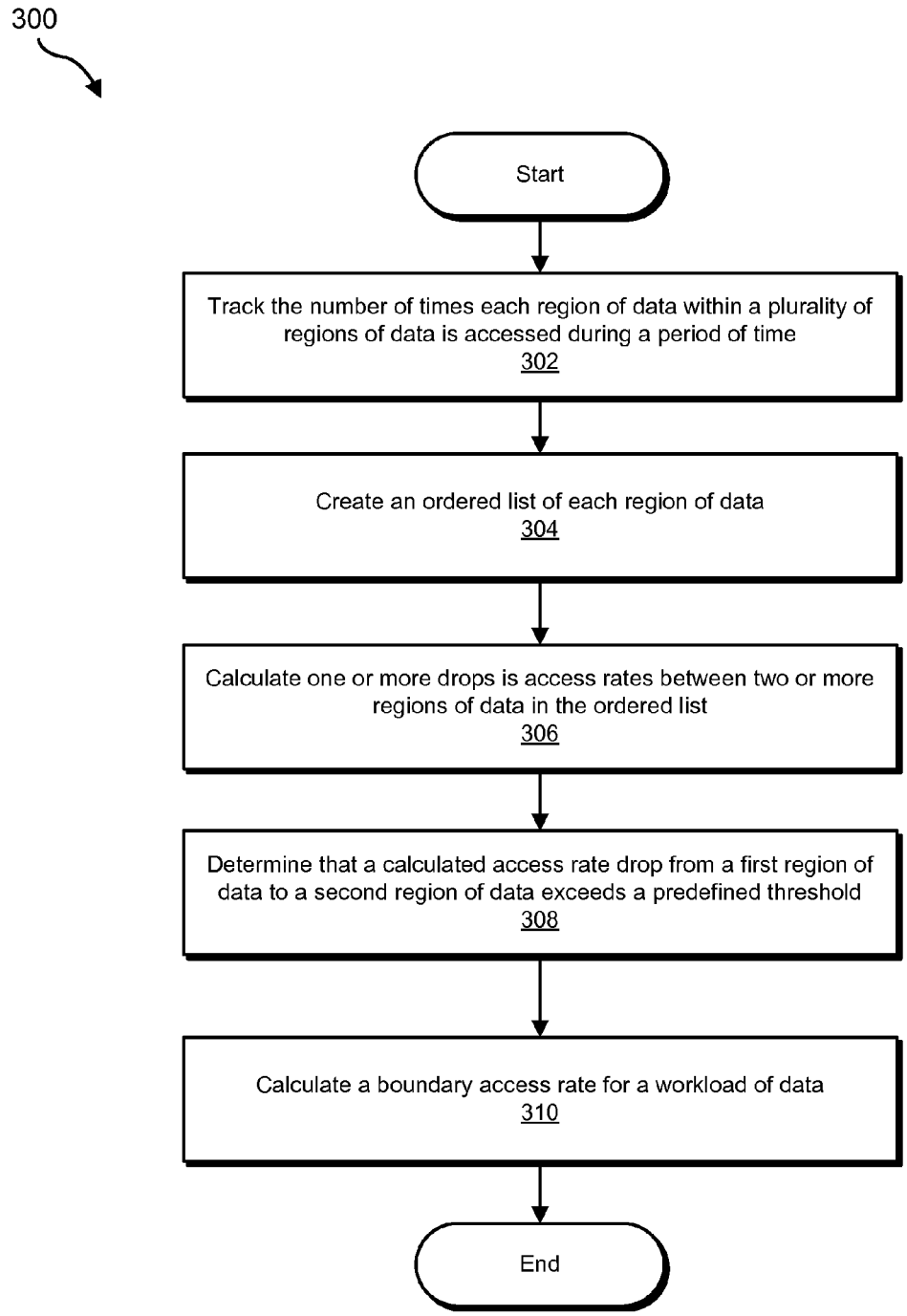
FIG. 3 is a flow diagram of an exemplary method for identifying access rate boundaries of workloads.
Figure 4:
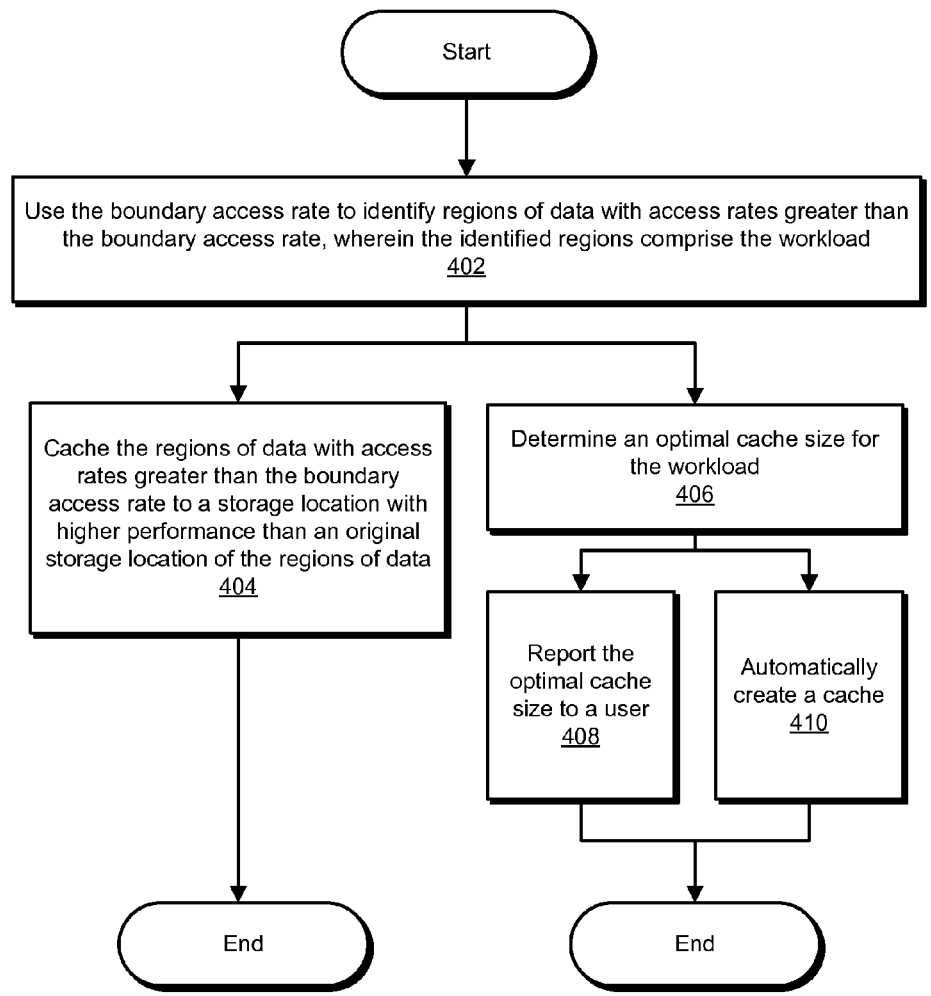
FIG. 4 is a flow diagram of an exemplary method for identifying regions of data with access rates greater than boundary access rates.

FIG. 3 is a flow diagram of an exemplary computer-implemented method 300 for identifying access rate boundaries of workloads. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 810 in FIG. 8, and/or portions of exemplary network architecture 900 in FIG. 9.

As illustrated in FIG. 3, at step 302 one or more of the systems described herein may track the number of times regions of data are accessed during a period of time. For example, tracking module 104 may, as part of computing system 206 in FIG. 2, track the number of times each region of data within a plurality of regions of data 212 is accessed during a period of time.

As used herein, the phrase "region of data" may refer to any unit of any type or form of values, variables, information, and/or other data. Examples of regions of data include, without limitation, files, portions of files, data blocks, portions of data streams, and/or database entries. Regions of data may store various types of data for any type of application, including database applications, productivity applications, utility applications, etc.

As used herein, the phrase "period of time" may refer to any length of time used to measure access frequency for data regions. A period of time be measured on the order of milliseconds, seconds, minutes, hours, etc. For example, a period of time may be 2-5 minutes, 15-30 minutes, an hour, or any other suitable time period for measuring access frequency for data regions.

The systems described herein may track accesses of data regions in a variety of ways. In some examples, tracking module 104 may track data accesses by identifying the number of reads and/or writes to each region of data within plurality of regions of data 212. Tracking module 104 may track reads and write from all applications and/or processes, from a subset of applications and/or processes, and/or for a particular application and/or process.

In some examples, tracking module 104 may track accesses to regions of data by periodically gathering kernel-level statistics, by using a file system filter, and/or in any other suitable manner. For example, tracking module 104 may periodically (e.g., multiple times a minute, every minute, every few minutes, etc.) execute a cacheStat command to fetch statistics from a kernel. In response, the kernel may copy statistics counters (e.g., hash tables) to the user-level process running tracking module 104 and may reset the hash tables and/or stat counters. Then, tracking module 104 may save the statistics from the Kernel to a file.

In some examples, all or a portion of tracking module 104 may be implemented at the kernel level. Tracking module 104, as part of the kernel, may collect statistics (e.g., access rates) in a variety of ways. For example, the tracking module 104 may store statistics in a hash table, and the hash table may include a global structure for all volumes that are being cached. The hash table may also be organized in a set of buckets and may include tens, hundreds, or thousands of buckets. The hash table may also be organized on a per-CPU basis with per-CPU locking for efficiency.

The hash table may be stored in a large region of contiguous memory (e.g., 1 MB) or a set of large memory chunks to make it easier to copy to the user level. Regions for volumes may be hashed into the buckets in the hash table, and the number of buckets in the hash table may be adjusted based on the average number of elements added to each bucket. Each bucket may include a single pointer that points to a first inserted element, and each element may include the following fields: (1) a volume identifier field, (2) an access count field, (3) a region number field, and/or (4) a next pointer field.

Returning to FIG. 3, at step 304, one or more of the systems described herein may create an ordered list of each region of data that is tracked in step 302. For example, creation module 106 may, as part of computing system 206 in FIG. 2, create ordered list 214 of each region of data from plurality of regions of data 212. By creating an ordered list, the systems described herein may provide a data structure that the represents how frequently each region of data is accessed relative to how frequently other regions of data are accessed.

Creation module 106 may create an ordered list in any suitable manner. For example, creation module may periodically (e.g., every 5, 10, or 15 minutes) read one or more statistics files identified by tracking module 104 and may aggregate the statistics into a file or data structure. Creation module 106 may edit, add to, or otherwise maintain any suitable type or form of database, data structure, and/or file.

As used herein, the phrase "ordered list" may refer to any logical configuration for maintaining a listing of regions of data in a specified order. The specified order may be a descending order, where regions of data are listed from most accessed to least accessed based on the number of accesses tracked for each region of data. Additionally or alternatively, the specified order may be an ascending order, where regions of data are listed from least accessed to most accessed. Examples of an ordered list may include, without limitation, an array, a hash table, a tree, or any other data structure capable of storing and organizing data.

Returning to FIG. 3, at step 306 one or more of the systems described herein may calculate one or more drops in access rates between two or more regions of data in the ordered list created in step 304. For example, processing module 108 may, as part of computing system 206, calculate one or more drops in access rates between two or more regions of data from plurality of regions of data 212 in ordered list 214. As used herein, the phrase "drop in access rate" generally refers to a drop in the number of times a first region of data is accessed as compared to the number of times a second region of data is accessed.

Figure 7A:
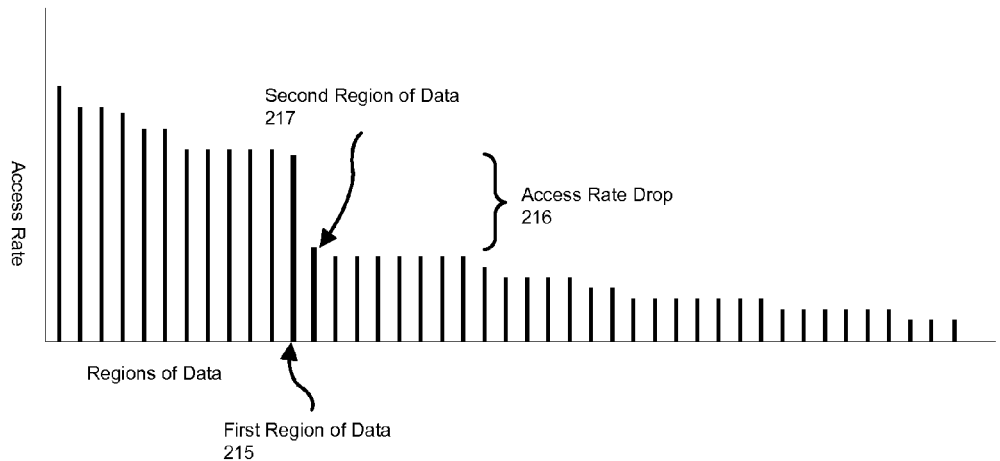
FIG. 7 is a block diagram of two graphs of regions of data organized based on access rates.
Figure 7B:
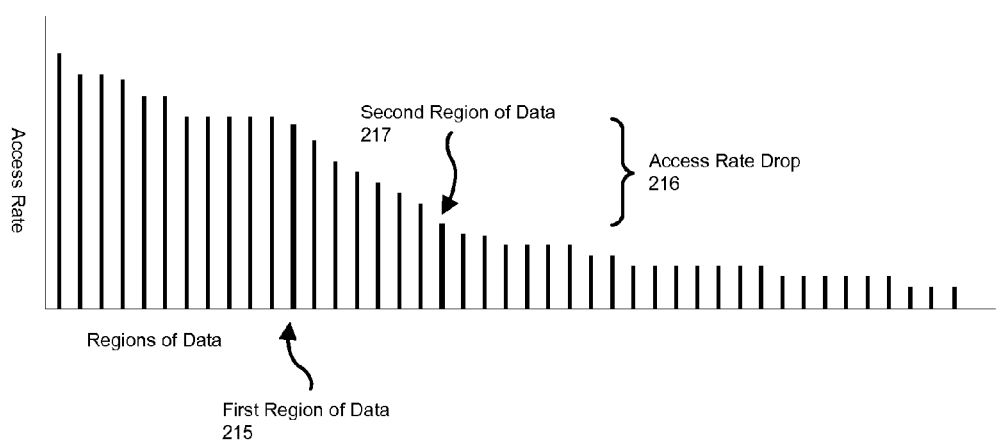

Processing module 108 may calculate an access-rate drop by determining an access rate difference between two regions of data in an ordered list. For example, processing module 108 may calculate the difference in access rates between adjacent regions in an ordered list. FIG. 7A shows an example of an access-rate drop 216 between two adjacent regions of data (first region of data 215 and second region of data 217). In other examples, processing module 108 may determine access rate differences between regions that are not necessarily adjacent to each other in an ordered list. FIG. 7B shows an example of an access-rate drop between two regions (e.g., first region of data 215 and second region of data 217) that are separated by 6 other regions in an ordered list. Processing module 108 may calculate access-rate drops for regions that are separated by less than a predefined number of regions (e.g., 2, 5, 10, etc.) in an ordered list. As another example, processing module 108 may calculate access-rate drops for regions that are separated by less than a predetermined percentage (e.g., 5%, 10%, etc.) of the total number of regions in an ordered list.

Returning to FIG. 3, at step 308 one or more of the systems described herein may determine that a calculated access-rate drop from a first region of data to a second region of data exceeds a predefined threshold. For example, determination module 110 may, as part of computing system 206 in FIG. 2, determine that a calculated access-rate drop 216 from a first region of data 215 to a second region of data 217 exceeds a predefined threshold.

Determination module 110 may determine that an access-rate drop exceeds a threshold in a variety of contexts. In one context, processing module 108 and determination module 110 may perform an iterative analysis on an ordered list of regions, starting with the highest access rate regions and moving down through the ordered list. For example, processing module 108 may calculate access-rate drops starting with a region of data with the highest access rate and may calculate an access-rate drop to the region of data with the next-highest access rate. Determination module 110 may then determine whether this access-rate drop is greater than a predefined threshold. If the access-rate drop is greater than the threshold, the systems described herein may proceed to step 310. Otherwise, processing module 108 may calculate an access-rate drop between regions with the second- and third-highest access rates, and determination module 110 may determine whether this access-rate drop is greater than the threshold. Processing module 108 and determination module 110 may continue this process on regions in the ordered list until finding an access-rate drop that is greater than the threshold. In the example shown in FIG. 7A, determination module 110 may determine that an access-rate drop 216 between first region of data 215 and second region of data 217 is greater than a threshold. In this example, access-rate drop 216 may be the first drop that is found to exceed the threshold as the list is processed in descending order.

As noted above, in addition to or instead of only calculating access-rate drops for adjacent regions, the systems disclosed herein may calculate access-rate drops between regions within a predefined range of each other. In such embodiments, determination module 110 may search for access-rate drops that exceed a threshold for access-rate drops between any regions within the predefined range. In the example shown in FIG. 7, if the predefined range is 10 regions, determination module 110 may determine that an access-rate drop between first region of data 215 and second region of data 217 exceed the predefined threshold.

A predefined access rate threshold may be set, defined and/or determined in any suitable manner. For example, a predefined access rate threshold may be set based on historical access rate information. Additionally or alternatively, a predefined access rate threshold may be set based on an estimate of how sharp an access-rate drop needs to be to provide a useful workload. For example, a predefined access rate threshold may be set such that a resulting workload amounts to a predefined percentage (e.g., 5% to 10%) of data regions accessed during the period of time. The predefined access rate threshold may also be set such that access temperatures of data regions in a resulting workload are relatively high (e.g., greater than 5).

Access rate thresholds may be defined by number of accesses, percentage of accesses, or in any other manner. For example, an access rate threshold may be defined as a 30% drop, a 60% drop, a 100% drop, a 300% drop, a 500% drop, a drop of 50, 100, and/or 1000 accesses per time period, using any other percentage and/or access drop thresholds, and/or in any other suitable manner.

Returning to FIG. 3, at step 310, one or more of the systems described herein may calculate, based on an access rate of the first region of data identified in step 308, a boundary access rate for a workload of data. For example, calculation module 112 may, as part of computing system 206 in FIG. 2, calculate a boundary access rate 218 for workload 213 based on an access rate of first region of data 215.

As used herein, the phrase "boundary access rate" generally refers to a threshold number of times for a region of data to be accessed during a specified time period to be a part of a workload. As used herein, the term "workload" generally refers to a set of regions of data that are accessed more frequently than other regions of data during a period of time (e.g., a workload may include a set of hot regions of data).

Calculation module 112 may calculate a boundary access rate for a workload of data in a variety of ways. For example, calculation module 112 may set a boundary access rate of a workload of data as the access rate of the data region located before the drop that exceeded the threshold. Alternatively, calculation module 112 may set a boundary access rate of a workload as the average or median of the access rates of the data regions on either side of the access-rate drop that exceeded the threshold (e.g., first region of data 215 and second region of data 217, as illustrated in FIGS. 7A and 7B). A boundary access rate of a workload may also be calculated in any other suitable manner.

Calculation module 112 may also calculate a variety of statistics related to a workload. For example, calculation module 112 may calculate average, minimum, and/or peak size of a workload during a period of time. Calculation module 112 may also calculate average, minimum, and/or maximum numbers of hot, cold, and/or warm regions of data after a scan. Additionally or alternatively, calculation module 112 may calculate average, minimum, and/or peak sizes of a replacement list after each scan (discussed in greater detail below) and/or may calculate average, minimum, and/ or peak sizes of data that cannot be accommodated in a cache (also discussed in greater detail below).

The systems and methods described herein may use boundary access rates of workloads in a variety of ways. For example, the systems and methods described herein may use boundary access rates of workloads to identify workloads to be cached, to identify data blocks that should be cached going forward, in calculating replacement lists, to calculate an optimal cache size, and/or in any other suitable manner.

As noted above and as illustrated in FIG. 4, the systems described herein, such as a user-level process, may, after calculating a boundary access rate, use the boundary access rate to identify regions of data that have access rates greater than the boundary access rate (step 402). Thus, the workload may be made up of the regions of data identified as having access rates greater than the boundary access rate.

Once regions of data that have accesses rates greater than a boundary access rate (e.g., boundary access rate 216) have been identified, the user-level process may cache the identified regions of data to a storage location with higher performance than an original storage location of the identified regions of data (step 404). For example, data in storage system 202 (e.g., workload 213) may be cached to high performance storage system 204, which may be a storage location with higher performance than storage system 202. In some examples, before a first workload boundary rate is calculated, the user-level process may use a relatively high static cache threshold (e.g., a threshold that is higher than the expected workload boundary rate) to begin populating a cache.

As used herein, the phrase "storage location with higher performance" may refer to any storage location, such as a solid-state drive or flash memory, with higher performance than an original, primary storage location of data. The phrase "high performance" may refer to a storage location with characteristics such as lower latency than an original storage location, higher access speeds than an original storage location, etc.

Moving data to high performance storage locations may be performed in a variety of contexts. As noted above, data may be cached to a high performance storage system. Additionally or alternatively, the systems described herein may move data to a higher performance location within a multi-tier storage system. For example, the systems described herein may move data regions among tiers within a multi-tier storage system (i.e., may make data tiering decisions) based on whether access rates of the data regions are above or below a workload boundary access rate.

As used herein, the phrase "multi-tier storage system" generally refers to any storage system that assigns different categories of data to virtual or physical storage devices with different characteristics. Multi-tier storage systems may have any number of tiers (e.g., two tiers, three tiers, four tiers, etc.), with higher performance storage locations being designated as higher tiers than storage locations with lower performance. Multi-tier storage system policies may indicate that frequently-accessed data should be moved to higher tiers and/or that infrequently-accessed data should be moved to lower tiers. The systems described herein may implement such tiering policies by moving data with access rates that are higher than a workload boundary rate from one tier (e.g., a lower tier) to another tier (e.g., a higher tier) of a multi-tier storage system. Thus, a workload (e.g., workload 213) may be stored in a higher-tiered storage location (e.g., high performance storage system 204) while other regions of data may be stored in a lower-tiered storage location (e.g., storage system 202).

The following examples discuss various aspects of making caching decisions (e.g., timing of caching, selecting data to be cached, selecting data to be removed from a cache, choosing a cache size, etc.). The principles discussed in the following examples of making caching decisions may also be implemented in making data tiering decisions (e.g., a high-performance tier may be considered to be a cache).

Caching data may be done retroactively or anticipatorily. For example, the systems described herein may move data retroactively by caching the regions of data whose access rates exceeded the boundary access rate during the period of time for which access-rate drops were calculated. Additionally or alternatively, the systems described herein may cache regions of data whose access rates exceed the boundary access rate during a time period following the original time period for which access-rate drops were calculated. In some examples, the user-level process may cache a region of data right after (or soon after) it becomes hot, without waiting for the end of a caching cycle period.

As noted, a user process may use a boundary access rate of a workload to create a replacement list (e.g., a list of regions that are to be replaced in a cache). The user process may track cached regions with entries in a cache index that may be used to quickly access cached regions of data. For example, a cache entry in a cache index may capture the translation of a logical region address to a solid state drive address where the region is cached. A cache index entry may also provide an access counter for a current time period and/or a last temperature state field (e.g., a field indicating the temperature measured for the region during the previous time period). Cache temperature may be tracked with one or more of a variety of temperature states (e.g., hot, warm, cold, and/or pin). If a region is part of a workload in a current time period, the region may be considered hot. If the region is no longer part of the workload, the region may transition to a warm state before becoming cold. A "pin" state may indicate that the region is not governed by access temperature.

In some examples, a region of data in a cache may be replaced as soon it becomes cold. To accomplish this, a user-level process may maintain a generation number that is incremented every time a scan is complete. When a cold entry is marked as invalid during a scan and a generation number is incremented after the scan, input/output operations with the new generation number are not active on invalid entries. By waiting for all input/output operations with a previous generation number to drain, a user-level process may ensure that input/output operations on invalid (e.g., cold) entries are drained as well. Once that happens, cold entries may be ready to be replaced immediately with a hotter region (e.g., a region from a workload), but they cannot be replaced before then.

A user-level process may scan entries in a cache index periodically using a two-hand clock algorithm (the periodicity of the cache index scan may be the same and/or different from the periodicity of determining a workload). During a scan, the value of the access counter may determine the access temperature for the cached region, and the temperature may be compared to the last temperature stored. If the current temperature is lower than the last temperature, the user-level process may reduce the temperature state by one position (e.g., from hot to warm or from warm to cold). Alternatively, if the current temperature is higher than the last temperature, the user-level process may increase the temperature state (e.g., from warm to hot). During the scan, if a new temperature state for a region is cold, the user-level process may add the region to the replacement list, such that at the end of a scan, the user-level process will have created a list of regions to be replaced. After a scan, the user-level process may reset the access counter for the current period, and the access counters for each region may be incremented for each access to the region during the current period.

In some situations, a replacement list may need to be rebuilt. For example, during a flushmeta operation (e.g., an operation invoked on reboot to persist the cache index and cached data), the replacement list may be converted to a bitmap (e.g., with one bit for each region in the cache). This bitmap may be stored in a metadata region of the cache, and during recovery after reboot, may be read to rebuild the replacement list.

In some examples, the user-level process may combine caching and replacement processes. For example, the user-level process may periodically (e.g., every 15-30 minutes) both calculate a workload and scan cached entries. The user-level process may identify regions to be cached based on an access rate boundary of the workload. The user-level process may begin caching data regions starting with the hottest regions (e.g., the most frequently accessed regions) first. Each time a region is cached, a replacement entry may be consumed. If the replacement list is shorter than the number of new regions whose access rates exceed the boundary, some regions from the workload may not be cached. In such situations, some warm entries in the cache may be replaced and/or the cache size may be increased to avoid churn and to optimize the cache for the workload.

As noted, if a cache is too small for a particular workload, cache thrashing and low cache hit rates may result. To avoid this situation, a user-level process may cache a percentage of the workload randomly and refrain from caching the rest of the workload. Additionally or alternatively, the user-level process may perform additional processing on the workload in an attempt to identify cyclic patterns that my result in cache churn and reduced cache performance. For example, a critical cache hit ratio, which may be defined as a size of the cache divided by a total logical volume size, may be calculated. If a cache hit ratio falls below the critical cache hit ratio, additional workload processing and management (described above) may need to be performed with respect to caching.

As noted, the systems described herein may determine an optimal cache size for a workload based on a size of the workload (step 406). The systems described herein may determine the optimal cache size in a variety of ways. For example, a user-level process may determine the optimal cache size based on an average, minimum, and/or peak size of a workload. In such examples, the systems described herein may determine that a size of an existing cache is smaller than a size needed to cache the workload and may increase a size of the existing cache to match the size of the workload. Alternatively, the systems described herein may determine that a size of an existing cache is the same size as the workload and may leave the cache size unchanged. In yet other examples, the systems described herein may determine that a size of an existing cache is larger than a size needed to cache the workload and may decrease a size of the cache to match the size of the workload and to optimize use of cache space. The user-level process may also decide to resize a cache based on a variety of other factors, such as when the number of replacement entries in a replacement list is less than the number of regions in a workload that have not been cached.

To handle growing and/or shrinking a cache size, a user-level process may store a "start" and "end" offset of a cache space. When an operation for increasing a cache size is initiated, the user-level process may reserve memory space at a start of the cache for metadata and may increase a value of the "end" offset. Alternatively, when an operation for decreasing a cache size is initiated, the user-level process may reduce the value of the "end" offset. Shrinking a cache may invalidate some cache entries, and to prevent access through these entries, the user-level process may check cache offset values each time a cache entry is referenced for reading cached data.

The systems described herein may resize caches automatically or may prompt manual cache creation and/or resizing. For example, once an optimal cache size is determined for a workload, the systems described herein may automatically (e.g., without user input and/or interaction) resize and/or create a cache based on the optimal cache size (step 410). Additionally or alternatively, the systems described herein may report the optimal cache size to a user (step 408), and the user may decide whether to use the optimal cache size to resize and/or create a cache. For example, the user may select an SSD or flash device with enough capacity to cover the optimal cache size.

In some embodiments, each time a workload is detected, a user-level process may learn associative patterns between regions of data (e.g., regions of data that an application operates on together or within a short time span). The user-level process may use such patterns, particularly if they repeat, to optimize caching. For example, the user-level process may store multiple workloads in a file (or other data construct) and may analyze the workloads for data access patterns. The user-level process may search for patterns of high-access data regions that may be located close together. Such a search may be performed by data mining algorithms, an APRIORI algorithm, and/or any other suitable algorithm or heuristic.

After identifying a pattern, the user-level process may store the pattern and test it against future workloads (effectively learning associative patterns may take hours or days). If the pattern continues to repeat itself, a confidence level for the pattern may be increased, and once the confidence level passes a threshold, the pattern may be considered a discovered associative pattern and may be used in caching.

A discovered associative pattern (or a list of patterns) may be grouped by volume based on applications (e.g., independent applications are likely to have independent patterns). In other words, associative patterns may be identified and/or analyzed on a per-application basis. As noted, once identified, associative patterns may be downloaded into a kernel for use in enhancing caching decisions.

A user-level process may implement associative patterns in caching decisions in a variety of ways. For example, when a region that is part of an associative pattern becomes hot (e.g., is accessed frequently), a user-level process may prefetch other regions that are part of the pattern. Also, when caching is performed based on an access-frequency threshold, a user-level process may give priority to regions that are part of associative patterns.

The systems described herein may also pin a region of an associative pattern in a cache such that the region is not replaced due to temperature variation. For example, when each region in an associative pattern is cached, unless all regions in the pattern become cold (and therefore eligible to be replaced), a user-level process may retain the regions of the associative pattern in the cache. Alternatively, if a region is not part of an associative pattern, the user-level process may replace the region as soon as it becomes cold.

The systems described herein may discover cyclic behavior of certain associative patterns. For example, an activity that occurs at a particular time each day may trigger a pattern to become active. Such patterns may be used to pre-warm a cache with regions from the pattern. It may be particularly useful to detect associative patterns that are active during a start-up or recovery phase of an application. Such associative patterns may remain active for a period of time after start-up, and the systems described herein may pre-fetch regions of these patterns just before start-up to speed up recoveries. Pre-fetching in this manner may improve failover and reboot/recovery times significantly.

Associative patterns may also be useful in cluster environments. For example, one cluster node may share an associative pattern with another cluster node, which may be particularly useful when parallel applications are running because associative patterns may be active on multiple cluster nodes. As another example, an associative pattern may be shared with a cluster node when an application responsible for the pattern fails over to that cluster node.

The systems described herein may automatically turn associative learning patterns on and off based on resource availability (e.g., processing power, disk space, etc.). A user may also be able to turn associative learning off and on to optimize caching and system performance.

Figure 5:
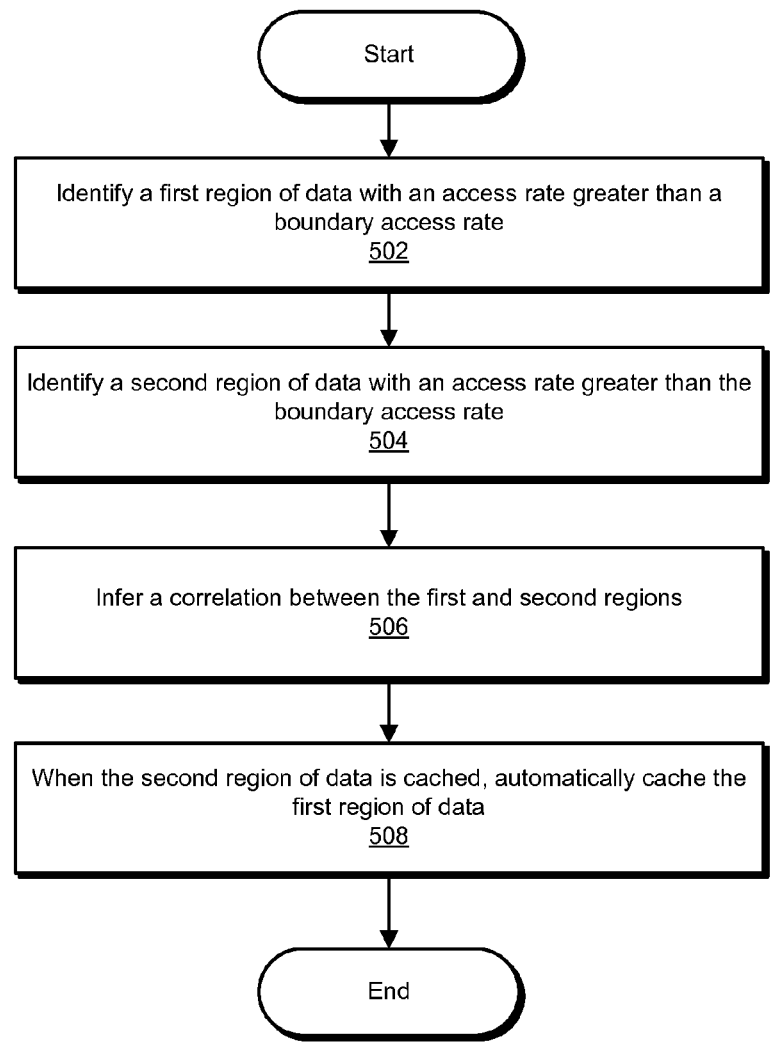
FIG. 5 is a flow diagram of an exemplary method for inferring a correlation between regions of data.

FIG. 5 illustrates an example of learning associative patterns. As illustrated in FIG. 5, the systems described herein may, after calculating a boundary access rate, (1) identify a first region of data with access rates greater than the boundary access rate (step 502), (2) identify a second region of data with access rates greater than the boundary access rate (step 504), and (3) infer a correlation between the first and second regions of data (step 506). The correlation may be based on an observation that accesses for the first region of data occur within a predefine range of time from when the accesses for the second region of data occur.

Once a correlation between the first and second regions of data is inferred, the systems described herein may automatically cache the first region of data whenever the second region of data is cached (step 508).

Figure 6:
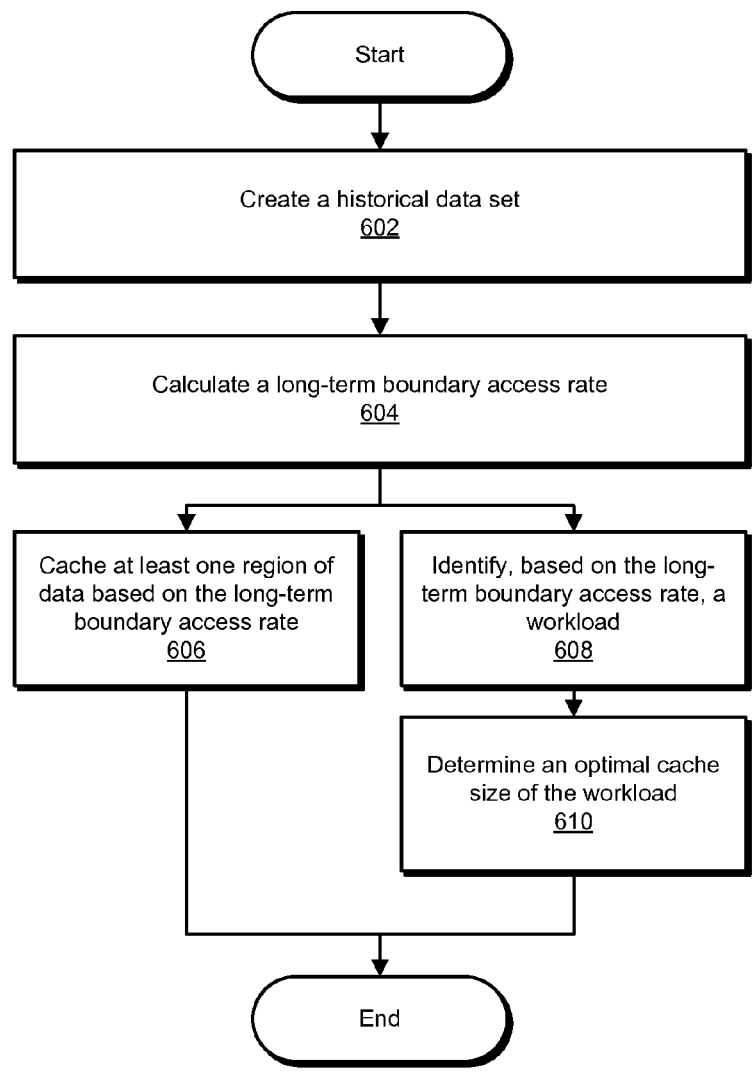
FIG. 6 is a flow diagram of an exemplary method for creating a historical data set.

The systems described herein may, after calculating a boundary access rate during a period of time, repeat the tracking, creating, and calculating steps described above during a plurality of subsequent time periods, as illustrated in FIG. 6. The systems described herein may then calculate a new boundary access rate for each subsequent time period. The systems described herein may use the new boundary access rates to create a historical data set that includes at least a subset of 1) the boundary access rate calculated for the original time period and 2) the new boundary access rates (step 602).

In some embodiments, the systems described herein may use the historical data set to calculate a long-term boundary access rate (step 604). A long-term boundary access rate may refer to the average number of times a region of data is accessed across a plurality of time periods to be a part of a workload. Alternatively, a long-term boundary access rate may refer to the peak number of times a region of data is accessed across a plurality of time periods to be a part of a workload.

In some embodiments, the systems described herein may use the long-term boundary access rate to identify, based on the long-term boundary access rate and/or one or more of the new boundary access rates, a workload (step 608). In such embodiments, the systems described herein may determine an optimal cache size of the workload based on a size of cache needed to cache at least a portion of the regions of data from the workload (step 610). Additionally or alternatively, the systems described herein may, based on the long-term boundary access rate and/or one or more of the new boundary access rates, cache at least one region of data (step 606). A long-term boundary access rate may be particularly useful in situations when a boundary access rate cannot be reliably or efficiently calculated for a current time period.

In some situations, a user-level process may not be running. For example, a kernel may track how long it has been since a replacement list has been built. If it has been longer than a predetermined period of time (e.g., 30 or 60 minutes), the kernel may assume that the user-level process is not running. In such situations, the kernel may be able to independently run a caching algorithm. For example, the kernel may use a static threshold value (e.g., this value may be based on a previous workload access rate boundary and/or may be lower or higher than a previous workload access rate boundary), and may cache regions of data whose access rates exceed this threshold.

As explained above, by dynamically determining a boundary access rate for a workload of data, the systems and methods described herein may enable caching systems to determine which regions of data would result in substantial cache hits if cached to a high-performance storage location. This may, in turn, enable a system and/or an administrator to predict an optimal size for the storage location with higher performance and/or more efficiently determine which regions of data to cache.

Figure 8:
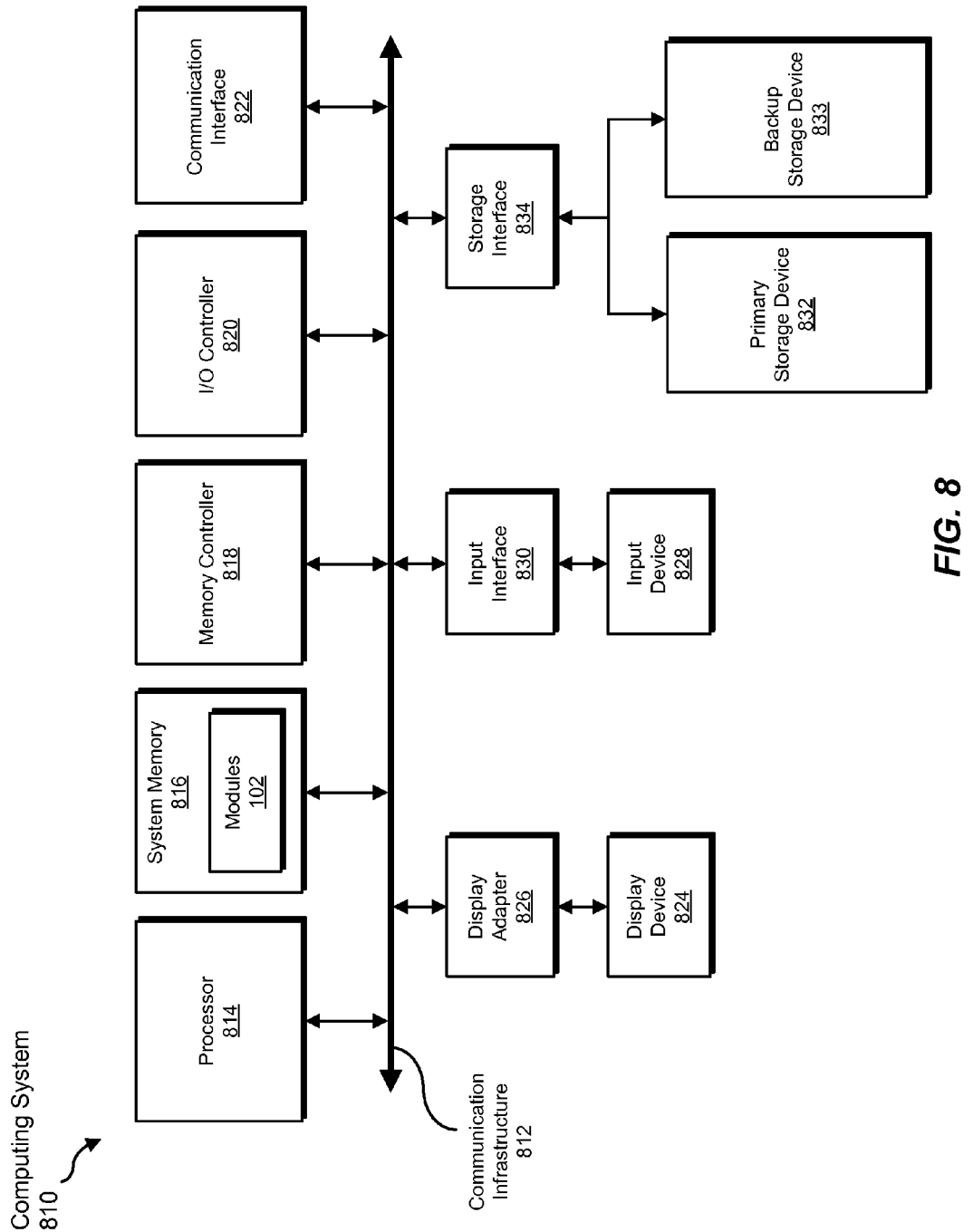
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the exemplary embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an Application Specific Integrated Circuit (ASIC) adapted to implement one or more of the exemplary embodiments disclosed herein.

Figure 9:
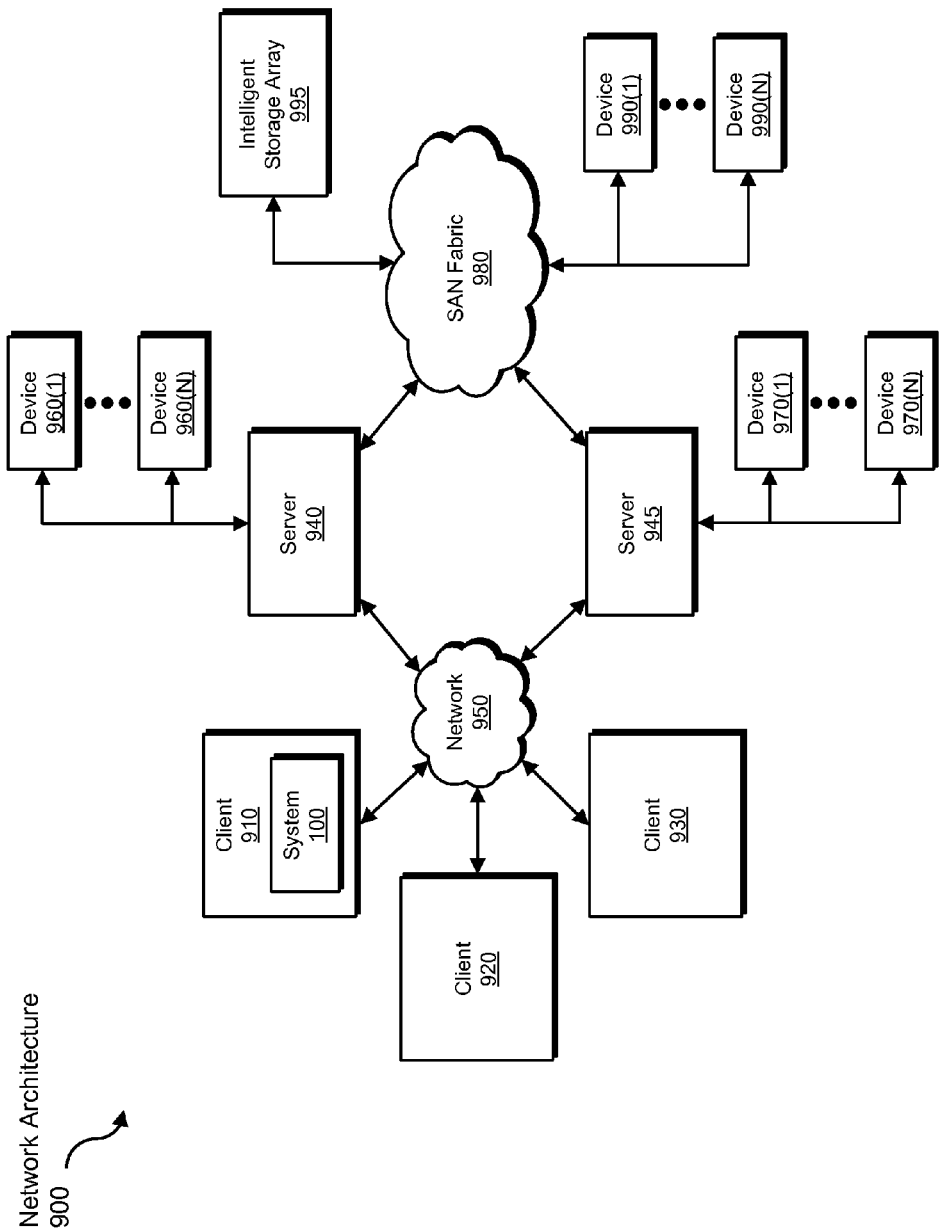
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an exemplary method for identifying access rate boundaries of workloads.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive the number of times each region of data within a plurality of regions of data is accessed during a period of time, transform the received data into a boundary access rate and use the boundary access rate to cache at least one regions of data and/or determine an optimal cache size. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for identifying access rate boundaries of workloads, at least a portion of the method being performed by a computing device comprising at least one processor, the method comprising:
    tracking the number of times each region of data within a plurality of regions of data is accessed during a period of time;
    creating, based on the number of accesses tracked for each region of data, an ordered list of each region of data from the plurality of regions of data, wherein the ordered list lists each region of data in at least one of:
        descending order from most accessed to least accessed based on the number of accesses tracked for each region of data;
        ascending order from least accessed to most accessed based on the number of accesses tracked for each region of data;
    calculating one or more drops in access rates between two or more regions of data in the ordered list;
    determining that a calculated access-rate drop from a first region of data to a second region of data exceeds a predefined threshold;
    in response to determining that the calculated access-rate drop exceeds the predefined threshold, calculating, based on an access rate of the first region of data, a boundary access rate for a workload of data, the workload comprising regions of data with access rates greater than the boundary access rate and excluding regions of data with access rates less than the boundary access rate.

2. The method of claim 1, further comprising:
    using the boundary access rate to identify regions of data with access rates greater than the boundary access rate, wherein the identified regions of data comprise the workload.

3. The method of claim 2, further comprising caching the regions of data with access rates greater than the boundary access rate to a storage location with higher performance than an original storage location of the regions of data with access rates greater than the boundary access rate.

4. The method of claim 2, further comprising:
    determining, based on a size of the workload, an optimal cache size for the workload;
    performing at least one of:
        reporting the optimal cache size to a user;
        automatically creating a cache based on the optimal cache size.

5. The method of claim 1, further comprising:
    identifying a first region of data with access rates greater than the boundary access rate and a second region of data with access rates greater than the boundary access rate;
    inferring a correlation between the first and second regions of data based on the access rates of the first and second regions of data;
    when the second region of data is cached, automatically caching the first region of data based on the inferred correlation between the first and second regions of data.

6. The method of claim 1, further comprising:
    repeating the tracking, creating, calculating and determining steps of claim 1 during a plurality of subsequent time periods such that a new boundary access rate is calculated for each time period within the plurality of subsequent time periods;
    creating a historical data set that includes at least a subset of the boundary access rates calculated for the time period and the plurality of subsequent time periods;
    calculating a long-term boundary access rate based on the historical data set;
    performing at least one of:
        caching at least one region of data based on the long-term boundary access rate;
        using the long-term boundary access rate to:
            identify, based on the long-term boundary access rate, the workload;
            determine an optimal cache size of the workload based on a size of cache needed to cache at least a portion of the regions of data from the workload.

7. The method of claim 1, wherein the ordered list comprises at least one of:
    an array;
    a hash table;
    a tree.

8. The method of claim 1, further comprising calculating the access-rate drop by calculating drops between regions of data that are less than a predetermined number of regions apart in the ordered list.

9. The method of claim 8, wherein the predetermined number of regions comprises a predefined percentage of a total number of regions of data in the ordered list.

10. The method of claim 1, wherein the predefined threshold comprises a predefined percentage drop.

11. A system for identifying access rate boundaries of workloads, the system comprising:
    a tracking module, stored in memory, that tracks the number of times each region of data within a plurality of regions of data is accessed during a period of time;
    a creation module, stored in memory, that creates, based on the number of accesses tracked for each region of data, an ordered list of each region of data from the plurality of regions of data, wherein the ordered list lists each region of data in at least one of:
        descending order from most accessed to least accessed based on the number of accesses tracked for each region of data;
        ascending order from least accessed to most accessed based on the number of accesses tracked for each region of data;
    a processing module, stored in memory, that calculates one or more drops in access rates between two or more regions of data in the ordered list;
    a determination module, stored in memory, that determines that a calculated access-rate drop from a first region of data to a second region of data exceeds a predefined threshold;
    a calculation module, stored in memory, that, in response to the determination that the calculated access-rate drop exceeds the predefined threshold, calculates, based on an access rate of the first region of data, a boundary access rate for a workload of data, the workload comprising regions of data with access rates greater than the boundary access rate and excluding regions of data with access rates less than the boundary access rate;
    at least one hardware processor configured to execute the tracking module, the creation module, the processing module, the determination module, and the calculation module.

12. The system of claim 11, wherein:
    the calculation module uses the boundary access rate to identify regions of data with access rates greater than the boundary access rate;
    the identified regions of data comprise the workload.

13. The system of claim 12, wherein the calculation module caches the regions of data with access rates greater than the boundary access rate to a storage location with higher performance than an original storage location of the regions of data with access rates greater than the boundary access rate.

14. The system of claim 12 wherein the calculation module:
    determines, based on a size of the workload, an optimal cache size for the workload;
    performs at least one of:
        reporting the optimal cache size to a user;
        automatically creating a cache based on the optimal cache size.

15. The system of claim 11, wherein the calculation module:
    identifies a first region of data with access rates greater than the boundary access rate and a second region of data with access rates greater than the boundary access rate;
    infers a correlation between the first and second regions of data based on the access rates of the first and second regions of data;
    when the second region of data is cached, automatically caches the first region of data based on the inferred correlation between the first and second regions of data.

16. The system of claim 11, wherein at least one of the tracking, creation, processing, determination, and calculation modules:
    repeats the tracking, creating, calculating and determining steps of claim 11 during a plurality of subsequent time periods such that a new boundary access rate is calculated for each time period within the plurality of subsequent time periods;
    creates a historical data set that includes at least a subset of the boundary access rates calculated for the time period and the plurality of subsequent time periods;
    calculates a long-term boundary access rate based on the historical data set;
    performs at least one of:
        caching at least one region of data based on the long-term boundary access rate;
        using the long-term boundary access rate to:
            identify, based on the long-term boundary access rate, the workload;
            determine an optimal cache size of the workload based on a size of cache needed to cache at least a portion of the regions of data from the workload.

17. The system of claim 11, wherein the ordered list comprises at least one of:
    an array;
    a hash table;
    a tree.

18. The system of claim 11, wherein the creation module calculates the calculated access rate by calculating drops between regions of data that are less than a predetermined number of regions apart in the ordered list using a predetermined distance.

19. The system of claim 18, wherein the predetermined distance comprises a predefined percentage of a total number of regions of data in the ordered list.

20. A non-transitory computer-storage medium comprising one or more computer-executable instructions that, when executed by at least one processor of a computing device, cause the computing device to:
    track the number of times each region of data within a plurality of regions of data is accessed during a period of time;
    create, based on the number of accesses tracked for each region of data, an ordered list of each region of data from the plurality of regions of data;
    calculate one or more drops in access rates between two or more regions of data in the ordered list, wherein the ordered list lists each region of data in at least one of:
        descending order from most accessed to least accessed based on the number of accesses tracked for each region of data;
        ascending order from least accessed to most accessed based on the number of accesses tracked for each region of data;
    determine that a calculated access-rate drop from a first region of data to a second region of data exceeds a predefined threshold;
    in response to determining that the calculated access-rate drop exceeds the predefined threshold, calculate based on an access rate of the first region of data, a boundary access rate for a workload of data, the workload comprising regions of data with access rates greater than the boundary access rate and excluding regions of data with access rates less than the boundary access rate.

\* \* \* \* \*